United States Patent
McCune et al.

(10) Patent No.: US 10,753,285 B2
(45) Date of Patent: Aug. 25, 2020

(54) METHOD OF ASSEMBLY FOR GAS TURBINE FAN DRIVE GEAR SYSTEM

(71) Applicant: United Technologies Corporation, Farmington, CT (US)

(72) Inventors: Michael E. McCune, Colchester, CT (US); William G. Sheridan, Southington, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 118 days.

(21) Appl. No.: 15/869,276

(22) Filed: Jan. 12, 2018

(65) Prior Publication Data
US 2018/0135523 A1 May 17, 2018

Related U.S. Application Data

(60) Continuation of application No. 14/222,919, filed on Mar. 24, 2014, now Pat. No. 9,874,150, which is a
(Continued)

(51) Int. Cl.
*F16H 57/08* (2006.01)
*F02C 7/36* (2006.01)
(Continued)

(52) U.S. Cl.
CPC ............. *F02C 7/36* (2013.01); *F02C 3/107* (2013.01); *F02C 7/32* (2013.01); *F02K 3/06* (2013.01);
(Continued)

(58) Field of Classification Search
CPC .... F02C 7/36; F02C 7/32; F02C 3/107; F16H 1/28; F16H 57/023; F16H 57/082;
(Continued)

(56) References Cited

U.S. PATENT DOCUMENTS 2,258,792 A    4/1941   New
2,591,743 A    4/1952   Thompson
(Continued)

FOREIGN PATENT DOCUMENTS

DE    3410977 A1    9/1985
EP    0791383    8/1997
(Continued)

OTHER PUBLICATIONS

Honeywell LF507. Jane's Aero-engines, Aero-engines—Turbofan. Feb. 9, 2012.
(Continued)

*Primary Examiner* — Rick K Chang
(74) *Attorney, Agent, or Firm* — Carlson, Gaskey & Olds, P.C.

(57) ABSTRACT

A method of assembling an epicyclic gear train according to an example of the present disclosure includes, among other things, the steps of providing a carrier having a central axis that includes spaced apart side walls and circumferentially spaced connecting structure defining mounts that interconnect the side walls, spaced apart apertures provided at an outer circumference of the carrier, gear pockets provided between the side walls and extending to the apertures, and a central opening in at least one of the walls, providing oil baffles between the side walls, the oil baffles including ends that abut the mounts, inserting a plurality of intermediate gears through the central opening, and then moving the intermediate gears radially outwardly into the gear pockets to extend into the apertures, inserting a sun gear through the central opening, and moving the plurality of intermediate gears radially inwardly to engage the sun gear.

30 Claims, 10 Drawing Sheets

Related U.S. Application Data division of application No. 13/975,635, filed on Aug. 26, 2013, now Pat. No. 8,763,251, which is a division of application No. 13/629,834, filed on Sep. 28, 2012, now Pat. No. 8,667,688, which is a continuation-in-part of application No. 12/718,436, filed on Mar. 5, 2010, now Pat. No. 8,276,275, which is a division of application No. 11/481,112, filed on Jul. 5, 2006, now Pat. No. 7,704,178.

(51) Int. Cl.

| | | |
|---|---|---|
| *F02K 3/06* | (2006.01) | |
| *F02C 3/107* | (2006.01) | |
| *F02C 7/32* | (2006.01) | |
| *F16H 57/023* | (2012.01) | |
| *F16H 1/28* | (2006.01) | |
| *F16H 57/04* | (2010.01) | |

(52) U.S. Cl.
CPC .............. *F16H 1/28* (2013.01); *F16H 57/023* (2013.01); *F16H 57/082* (2013.01); *F05D 2230/60* (2013.01); *F05D 2260/40311* (2013.01); *F16H 57/0423* (2013.01); *F16H 57/0456* (2013.01); *F16H 57/0479* (2013.01); *F16H 57/0486* (2013.01); *Y02T 50/671* (2013.01); *Y10T 29/49464* (2015.01)

(58) Field of Classification Search
CPC .............. F16H 57/0479; F16H 57/0456; F16H 57/0423; F16H 57/0486; F02K 3/06; Y10T 29/49464; Y02T 50/671; F05D 2230/60; F05D 2260/40311
See application file for complete search history.

(56) References Cited

U.S. PATENT DOCUMENTS

| | | | |
|---|---|---|---|
| 2,936,655 A | 5/1960 | Peterson et al. | |
| 3,021,731 A | 2/1962 | Stoeckicht | |
| 3,194,487 A | 7/1965 | Tyler et al. | |
| 3,287,906 A | 11/1966 | McCormick | |
| 3,352,178 A | 11/1967 | Lindgren et al. | |
| 3,412,560 A | 11/1968 | Gaubatz | |
| 3,650,353 A | 3/1972 | Abbott | |
| 3,747,343 A | 7/1973 | Rosen | |
| 3,754,484 A | 8/1973 | Roberts | |
| 3,820,719 A | 6/1974 | Clark | |
| 3,853,432 A | 12/1974 | Cronstedt | |
| 3,892,358 A | 7/1975 | Gisslen | |
| 3,932,058 A | 1/1976 | Harner et al. | |
| 3,935,558 A | 1/1976 | Miller et al. | |
| 3,988,889 A | 11/1976 | Chamay et al. | |
| 4,130,872 A | 12/1978 | Harloff | |
| 4,271,928 A | 6/1981 | Northern | |
| 4,284,174 A | 8/1981 | Salvana et al. | |
| 4,378,711 A | 4/1983 | Daniel | |
| 4,478,551 A | 10/1984 | Honeycutt, Jr. et al. | |
| 4,649,114 A | 3/1987 | Miltenburger et al. | |
| 4,696,156 A | 9/1987 | Burr et al. | |
| 4,827,712 A | 5/1989 | Coplin | |
| 4,914,904 A | 4/1990 | Parnes et al. | |
| 4,979,362 A | 12/1990 | Vershure, Jr. | |
| 5,102,379 A | 4/1992 | Pagluica et al. | |
| 5,141,400 A | 8/1992 | Murphy et al. | |
| 5,317,877 A | 6/1994 | Stuart | |
| 5,391,125 A | 2/1995 | Turra et al. | |
| 5,433,674 A | 7/1995 | Sheridan et al. | |
| 5,447,411 A | 9/1995 | Curley et al. | |
| 5,466,198 A | 11/1995 | McKibbin et al. | |
| 5,472,383 A | 12/1995 | McKibbin | |
| 5,524,847 A | 6/1996 | Brodell et al. | |
| 5,677,060 A | 10/1997 | Terentieva et al. | |
| 5,778,659 A | 7/1998 | Duesler et al. | |
| 5,857,836 A | 1/1999 | Stickler et al. | |
| 5,915,917 A | 6/1999 | Eveker et al. | |
| 5,975,841 A | 11/1999 | Lindemuth et al. | |
| 5,985,470 A | 11/1999 | Spitsberg et al. | |
| 6,158,210 A | 12/2000 | Orlando | |
| 6,223,616 B1 | 5/2001 | Sheridan | |
| 6,315,815 B1 | 11/2001 | Spadaccini et al. | |
| 6,318,070 B1 | 11/2001 | Rey et al. | |
| 6,387,456 B1 | 5/2002 | Eaton, Jr. et al. | |
| 6,517,341 B1 | 2/2003 | Brun et al. | |
| 6,607,165 B1 | 8/2003 | Manteiga et al. | |
| 6,709,492 B1 | 3/2004 | Spadaccini et al. | |
| 6,814,541 B2 | 11/2004 | Evans et al. | |
| 7,011,599 B2 | 3/2006 | Becquerelle et al. | |
| 7,021,042 B2 | 4/2006 | Law | |
| 7,033,301 B2 | 4/2006 | Kimes | |
| 7,104,918 B2 | 9/2006 | Mitrovic | |
| 7,112,157 B2 | 9/2006 | Uebbing | |
| 7,214,160 B2 | 5/2007 | Illerhaus | |
| 7,328,580 B2 | 2/2008 | Lee et al. | |
| 7,338,404 B2 | 3/2008 | Gassmann et al. | |
| 7,374,403 B2 | 5/2008 | Decker et al. | |
| 7,442,143 B2 | 10/2008 | Gassmann et al. | |
| 7,490,460 B2 | 2/2009 | Moniz et al. | |
| 7,591,754 B2 | 9/2009 | Duong et al. | |
| 7,662,059 B2 | 2/2010 | McCune | |
| 7,704,178 B2 * | 4/2010 | Sheridan ................ F01D 25/18 | |
| | | | 475/159 |
| 7,806,651 B2 | 10/2010 | Kennepohl et al. | |
| 7,824,305 B2 | 11/2010 | Duong et al. | |
| 7,926,260 B2 | 4/2011 | Sheridan et al. | |
| 7,997,868 B1 | 8/2011 | Liang et al. | |
| 8,172,717 B2 | 5/2012 | Lopez et al. | |
| 8,202,772 B2 | 6/2012 | Sheridan et al. | |
| 8,205,432 B2 | 6/2012 | Sheridan | |
| 8,276,275 B2 * | 10/2012 | Sheridan ................ F01D 25/18 | |
| | | | 29/893.1 |
| 8,667,688 B2 * | 3/2014 | McCune ................ F16H 57/082 | |
| | | | 29/893.1 |
| 8,747,272 B2 | 6/2014 | Imai et al. | |
| 8,753,243 B2 | 6/2014 | McCune et al. | |
| 8,763,251 B2 * | 7/2014 | McCune ................ F16H 57/082 | |
| | | | 29/893.1 |
| 9,874,150 B2 * | 1/2018 | McCune ................ F16H 57/082 | |
| 2004/0259679 A1 | 12/2004 | Becquerelle et al. | |
| 2008/0003096 A1 | 1/2008 | Kohli et al. | |
| 2008/0116009 A1 | 5/2008 | Sheridan et al. | |
| 2008/0317588 A1 | 12/2008 | Grabowski et al. | |
| 2009/0056343 A1 | 3/2009 | Suciu et al. | |
| 2009/0111639 A1 | 4/2009 | Klingels | |
| 2010/0035719 A1 | 2/2010 | Wang | |
| 2010/0105516 A1 | 4/2010 | Sheridan et al. | |
| 2010/0148396 A1 | 6/2010 | Xie et al. | |
| 2010/0150702 A1 | 6/2010 | Sheridan et al. | |
| 2010/0212281 A1 | 8/2010 | Sheridan | |
| 2010/0218483 A1 | 9/2010 | Smith | |
| 2010/0261571 A1 | 10/2010 | Matsuoka et al. | |
| 2010/0331139 A1 | 12/2010 | McCune | |
| 2011/0159797 A1 | 6/2011 | Beltman et al. | |
| 2011/0293423 A1 | 12/2011 | Bunker et al. | |
| 2012/0124964 A1 | 5/2012 | Hasel et al. | |
| 2014/0045645 A1 | 2/2014 | McCune et al. | |

FOREIGN PATENT DOCUMENTS

| | | |
|---|---|---|
| EP | 1142850 | 10/2001 |
| EP | 1783344 | 5/2007 |
| EP | 1876338 | 1/2008 |
| GB | 1516041 | 6/1978 |
| GB | 2041090 | 9/1980 |
| GB | 2426792 | 12/2006 |
| JP | 6-1889 | 1/1994 |
| JP | 2001-208146 | 8/2001 |
| JP | 2005-163666 | 6/2005 |
| JP | 2005-207472 | 8/2005 |

(56) References Cited

FOREIGN PATENT DOCUMENTS

| WO | 2007038674 | 4/2007 |
|---|---|---|
| WO | 2012098108 | 7/2012 |

OTHER PUBLICATIONS

Honeywell TFE731. Jane's Aero-engines, Aero-engines—Turbofan. Jul. 18, 2012.
NASA Conference Publication. Quiet, powered-lift propulsion. Cleveland, Ohio. Nov. 14-15, 1978. pp. 1-420.
"Civil Turbojet/Turbofan Specifications", Jet Engine Specification Database (Apr. 3, 2005).
Kandebo, S.W. (1993). Geared-turbofan engine design targets cost, complexity. Aviation Week & Space Technology, 148(8). Start p. 32.
Hendricks, E.S. and Tong, M.T. (2012). Performance and weight estimates for an advanced open rotor engine. NASA/TM-2012-217710. pp. 1-13.
Guynn, M. D., Berton, J.J., Fisher, K. L., Haller, W.J., Tong, M. T., and Thurman, D.R. (2011). Refined exploration of turbofan design options for an advanced single-aisle transport. NASA/TM-2011-216883. pp. 1-27.
Zalud, T. (1998). Gears put a new spin on turbofan performance. Machine Design, 70(20), p. 104.
Kurzke, J. (2008). Preliminary Design, Aero-engine design: From state of the art turbofans towards innovative architectures. pp. 1-72.
Zamboni, G. and Xu, L. (2009). Fan root aerodynamics for large bypass gas turbine engines: Influence on the engine performance and 3D design. Proceedings of ASME Turbo Expo 2009: Power for Land, Sea and Air. Jun. 8-12, 2009, Orlando, Florida, USA. pp. 1-12.
Han, J., Dutta, S., and Ekkad, S.V. (2000). Gas turbine heat transfer and cooling technology. New York, NY: Taylor & Francis. pp. 1-25, 129-157, and 160-249.
Mattingly, J.D. (1996). Elements of gas turbine propulsion. New York, New York: McGraw-Hill, Inc. pp. 1-18, 60-62, 85-87, 95-104, 121-123, 223-234, 242-245, 278-280, 303-309, 323-326, 462-479, 517-520, 563-565, 673-675, 682-685, 697-699, 703-705, 802-805, 862-864, and 923-925.
Declaration of Reza Abhari, Ph.D. In re U.S. Pat. No. 8,844,265. Executed Jun. 28, 2016. pp. 1-91.
Declaration of John Eaton, Ph.D. In re U.S. Pat. No. 8,869,568. Executed Mar. 28, 2016. pp. 1-87.
Declaration of Reza Abhari. In re U.S. Pat. No. 8,695,920. Executed Nov. 30. pp. 1-67.
Declaration of Reza Abhari. In re U.S. Pat. No. 8,448,895. Executed Nov. 28. pp. 1-81.
Declaration of Reza Abhari. In re U.S. Pat. No. 8,695,920, claims 1-4, 7-14, 17 and 19. Executed Nov. 29. pp. 1-102.
Declaration of Dr. Magdy Attia. In re U.S. Pat. No. 8,313,280. Executed Oct. 21, 2016. pp. 1-88.
Lord, W.K., MacMartin, D.G., and Tillman, T.G. (2000). Flow control opportunities in gas turbine engines. American Institute of Aeronautics and Astronautics. pp. 1-15.
Daly, M. Ed. (2010). Jane's Aero-Engine. Issue Twenty-seven. Mar. 2010. p. 633-636.
Roux, E. (2007). Turbofan and turbojet engines database handbook. Editions Elodie Roux. Blagnac: France. pp. 1-595.
Wilfert, G. (2008). Geared fan. Aero-Engine Design: From State of the Art Turbofans Towards Innovative Architectures, von Karman Institute for Fluid Dynamics, Belgium, Mar. 3-7, 2008. pp. 1-26.
Declaration of Dr. Magdy Attia. In re U.S. Pat. No. 8,517,668. Executed Dec. 8, 2016. pp. 1-81.
Cramoisi, G. Ed. (2012). Death in the Potomac: The crash of Air Florida Flight 90. Air Crash Investigations. Accident Report NTSB/AAR-82-8. p. 45-47.
Norton, M. and Karczub, D. (2003). Fundamentals of noise and vibration analysis for engineers. Press Syndicate of the University of Cambridge. New York: New York. p. 524.

U.S. Department of Transportation: Federal Aviation Administration Advisory Circular. Runway overrun prevention. Dated: Nov. 6, 2007. p. 1-8 and Appendix 1 p. 1-15, Appendix 2 p. 1-6, Appendix 3 p. 1-3, and Appendix 4 p. 1-5.
U.S. Department of Transportation: Federal Aviation Administration Advisory Circular. Standard operating procedures for flight deck crewmembers. Dated: Feb. 27, 2003.. p. 1-6 and Appendices.
Vasudevan, A.K. and Petrovic, J.J. (1992). A comparative overview of molybedenum disilicide composites. Materials Science and Engineering, A155, 1992. pp. 1-17.
Clarke, D.R. and Levi, C.G. (2003). Materials design for the next generation thermal barrier coatings. Annual. Rev. Mater. Res. vol. 33. 2003. pp. 383-417.
Lee, K.N. (2000). Current status of environmental barrier coatings for Si-Based ceramics. Surface and Coatings Technology 133-134, 2000. pp. 1-7.
Bornstein, N. (1993). Oxidation of advanced intermetallic compounds. Journal de Physique IV, 1993, 03 (C9), pp. C9-367-C9-373.
Krenkel, W., Naslain, R., and Schneider, H. Eds. (2001). High temperature ceramic matrix composites pp. 224-229. Weinheim, DE: Wiley-VCH Verlag GmbH.
Gibala, R., Ghosh, A.K., Van Aken, D.C., Srolovitz, D.J., Basu, A., Chang, H., . . . Yang, W. (1992). Mechanical behavior and interface design of MoSi2-based alloys and composites. Materials Science and Engineering, A155, 1992. pp. 147-158.
Shah, D.M. (1992). MoSi2 and other silicides as high temperature structural materials. Superalloys 1992. The Minerals, Metals, & Materials Society. pp. 409-422.
Zhao, J.C. and Westbrook, J.H. (2003). Ultrahigh-temperature materials for jet engines. MRS Bulletin. vol. 28 (9). Sep. 2003. pp. 622-630.
Tsirlin, M., Pronin, Y.E., Florina, E.K., Mukhametov, S. Kh., Khatsernov, M.A., Yun, H.M., . . . Kroke, E. (2001). Experimental investigation of multifunctional interphase coatings on SiC fibers for non-oxide high temperature resistant CMCs. High Temperature Ceramic Matrix Composites. 4th Int'l Conf. on High Temp. Ceramic Matrix Composites. Oct. 1-3, 2001. pp. 149-156.
Jacobson, N.S. (1993). Corrosion of silicon-based ceramics in combustion environments. J. Am. Ceram. Soc. 76 (1). pp. 3-28.
Jorgensen, P.J., Wadsworth, M.E., and Cutler, I.B. (1961). Effects of water vapor on oxidation of silicon carbide. J. Am. Ceram. Soc. 44(6). pp. 248-261.
Xu, Y., Cheng, L., Zhang, L., Ying, H., and Zhou, W. (1999). Oxidation behavior and mechanical properties of a C/SiC composites with Si—MoSi2 oxidation protection coating. J. of Mat. Sci. vol. 34. 1999. pp. 6009-6014.
Sundaram, S.K., Hsu, J-Y., Speyer, R.F. (1995). Molten glass corrosion resistance of immersed combustion-heating tube materials in e-glass. J. Am. Ceram. Soc. 78(7). pp. 1940-1946.
Jeng, Y.-L., Lavernia, E.J. (1994). Processing of molybdenum disilicide. J. of Mat. Sci. vol. 29. 1994. pp. 2557-2571.
Suzuki, Y., Morgan, P.E.D., and Niihara, K. (1998). Improvement in mechanical properties of powder-processed MoSi2 by the addition of Sc2O3 and Y2O3. J. Am. Ceram. Soci. 81(12). pp. 3141-3149.
Webster, J.D., Westwood, M.E., Hayes, F.H., Day, R.J., Taylor, R., Duran, A., . . . Vogel, W.D. (1998). Oxidation protection coatings for C/SiC based on yttrium silicate. Journal of European Ceramic Society vol. 18. 1998. pp. 2345-2350.
Petrovic, J.J., Castro, R.G., Vaidya, R.U., Peters, M.I., Mendoza, D., Hoover, R.C., and Gallegos, D.E. (2001). Molybdenum disilicide materials for glass melting sensor sheaths. Ceramic Engineering and Science Proceedings. vol. 22(3). 2001. pp. 59-64.
Kahn, H., Tayebi, N., Ballarini, R., Mullen, R.L., Heuer, A.H. (2000). Fracture toughness of polysilicon MEMS devices. Sensors and Actuators vol. 82. 2000. pp. 274-280.
Muhlstein, C.L., Stach, E.A., and Ritchie, R.O. (2002). A reaction-layer mechanism for the delayed failure of micron-scale polycrystalline silicon structural films subjected to high-cycle fatigue loading. Acta Materialia vol. 50. 2002. pp. 3579-3595.
Sundaram, S.K., Hsu, J-Y., Speyer, R.F. (1994). Molten glass corrosion resistance of immersed combustion-heating tube materials in soda-lime-silicate glass. J. Am. Ceram. Soc. 77(6). pp. 1613-1623.

(56) References Cited

OTHER PUBLICATIONS

Leckie, F.A. and Dal Bello, D.J. (2009). Strength and stiffness of engineering systems. Mechanical Engineering Series. Springer. pp. 1-3.
El-Sayad, A.F. (2008). Aircraft propulsion and gas turbine engines. Boca Raton, FL: CRC Press. pp. 215-219 and 855-860.
Bunker, R.S. (2005). A review of shaped hole turbine film-cooling technology. Journal of Heat Transfer vol. 127. Apr. 2005. pp. 441-453.
McMillian, A. (2008) Material development for fan blade containment casing. Abstract. p. 1. Conference on Engineering and Physics: Synergy for Success 2006. Journal of Physics: Conference Series vol. 105. London, UK. Oct. 5, 2006.
Kurzke, J. (2009). Fundamental differences between conventional and geared turbofans. Proceedings of ASME Turbo Expo: Power for Land, Sea, and Air. 2009, Orlando, Florida. pp. 145-151.
Agarwal, B.D and Broutman, L.J. (1990). Analysis and performance of fiber composites, 2nd Edition. John Wiley & Sons, Inc. New York: New York. pp. 1-30, 50-51, 56-58, 60-61, 64-71, 87-89, 324-329, 436-437.
Carney, K., Pereira, M. Revilock, and Matheny, P. (2003). Jet engine fan blade containment using two alternate geometries. 4th European LS-DYNA Users Conference. pp. 1-10.
Brines, G.L. (1990). The turbofan of tomorrow. Mechanical Engineering: The Journal of the American Society of Mechanical Engineers,108(8), 65-67.
Faghri, A. (1995). Heat pipe and science technology. Washington, D.C.: Taylor & Francis. pp. 1-60.
Hess, C. (1998). Pratt & Whitney develops geared turbofan. Flug Revue 43(7). Oct. 1998.
Grady, J.E., Weir, D.S., Lamoureux, M.C., and Martinez, M.M. (2007). Engine noise research in NASA's quiet aircraft technology project. Papers from the International Symposium on Air Breathing Engines (ISABE). 2007.
Griffiths, B. (2005). Composite fan blade containment case. Modern Machine Shop. Retrieved from: http://www.mmsonline.com/articles/composite-fan-blade-containment-case pp. 1-4.
Hall, C.A. and Crichton, D. (2007). Engine design studies for a silent aircraft. Journal of Turbomachinery, 129, 479-487.
Haque, A. and Shamsuzzoha, M., Hussain, F., and Dean, D. (2003). S20-glass/epoxy polymer nanocomposites: Manufacturing, structures, thermal and mechanical properties. Journal of Composite Materials, 37 (20), 1821-1837.
Brennan, P.J. and Kroliczek, E.J. (1979). Heat pipe design handbook. Prepared for National Aeronautics and Space Administration by B & K Engineering, Inc. Jun. 1979. pp. 1-348.
Horikoshi, S. and Serpone, N. (2013). Introduction to nanoparticles. Microwaves in nanoparticle synthesis. Wiley-VCH Verlag GmbH & Co. KGaA. pp. 1-24.
Kerrebrock, J.L. (1977). Aircraft engines and gas turbines. Cambridge, MA: The MIT Press. p. 11.
Xie, M. (2008). Intelligent engine systems: Smart case system. NASA/CR-2008-215233. pp. 1-31.
Knip, Jr., G. (1987). Analysis of an advanced technology subsonic turbofan incorporating revolutionary materials. NASA Technical Memorandum. May 1987. pp. 1-23.
Willis, W.S. (1979). Quiet clean short-haul experimental engine (QCSEE) final report NASA/CR-159473 pp. 1-289.
Kojima, Y., Usuki, A. Kawasumi, M., Okada, A., Fukushim, Y., Kurauchi, T., and Kamigaito, O. (1992). Mechanical properties of nylon 6-clay hybrid. Journal of Materials Research, 8(5), 1185-1189.
Kollar, L.P. and Springer, G.S. (2003). Mechanics of composite structures. Cambridge, UK: Cambridge University Press. p. 465.
Ramsden, J.M. (Ed). (1978). The new European airliner. Flight International, 113(3590). Jan. 7, 1978. pp. 39-43.
Langston, L. and Faghri, A. Heat pipe turbine vane cooling. Prepared for Advanced Turbine Systems Annual Program Review. Morgantown, West Virginia. Oct. 17-19, 1995. pp. 3-9.
Oates, G.C. (Ed). (1989). Aircraft propulsion systems and technology and design. Washington, D.C.: American Institute of Aeronautics, Inc. pp. 341-344.
Lau, K., Gu, C., and Hui, D. (2005). A critical review on nanotube and nanotube/nanoclay related polymer composite materials. Composites: Part B 37(2006) 425-436.
Shorter Oxford English dictionary, 6th Edition. (2007). vol. 2, N-Z. p. 1888.
Lynwander, P. (1983). Gear drive systems: Design and application. New York, New York: Marcel Dekker, Inc. pp. 145, 355-358.
Sweetman, B. and Sutton, O. (1998). Pratt & Whitney's surprise leap. Interavia Business & Technology, 53.621, p. 25.
Mattingly, J.D. (1996). Elements of gas turbine propulsion. New York, New York: McGraw-Hill, Inc. pp. 8-15.
Pyrograf-III Carbon Nanofiber. Product guide. Retrieved Dec. 1, 2015 from: http://pyrografproducts.com/Merchant5/merchant.mvc?Screen=cp_nanofiber.
Nanocor Technical Data for Epoxy Nanocomposites using Nanomer 1.30E Nanoclay. Nnacor, Inc. Oct. 2004.
Ratna, D. (2009). Handbook of thermoset resins. Shawbury, UK: iSmithers. pp. 187-216.
Wendus, B.E., Stark, D.F., Holler, R.P., and Funkhouser, M.E. (2003). Follow-on technology requirement study for advanced subsonic transport. NASA/CR-2003-212467. pp. 1-37.
Silverstein, C.C., Gottschlich, J.M., and Meininger, M. The feasibility of heat pipe turbine vane cooling. Presented at the International Gas Turbine and Aeroengine Congress and Exposition, The Hague, Netherlands. Jun. 13-16, 1994.pp. 1-7.
Merriam-Webster's collegiate dictionary, 11th Ed. (2009). p. 824.
Merriam-Webster's collegiate dictionary, 10th Ed. (2001). p. 1125-1126.
Whitaker, R. (1982). ALF 502: plugging the turbofan gap. Flight International, p. 237-241, Jan. 30, 1982.
Hughes, C. (2010). Geared turbofan technology. NASA Environmentally Responsible Aviation Project. Green Aviation Summit. NASA Ames Research Center. Sep. 8-9, 2010. pp. 1-8.
Gliebe, P.R. and Janardan, B.A. (2003). Ultra-high bypass engine aeroacoustic study. NASA/CR-2003-21252. GE Aircraft Engines, Cincinnati, Ohio. Oct. 2003. pp. 1-103.
Moxon, J. How to save fuel in tomorrow's engines. Flight International. Jul. 30, 1983. 3873(124). pp. 272-273.
File History for U.S. Appl. No. 12/131,876.
Cusick, M. (1981). Avco Lycoming's ALF 502 high bypass fan engine. Society of Automotive Engineers, inc. Business Aircraft Meeting & Exposition. Wichita, Kansas. Apr. 7-10, 1981. pp. 1-9.
Fledderjohn, K.R. (1983). The TFE731-5: Evolution of a decade of business jet service. SAE Technical Paper Series. Business Aircraft Meeting & Exposition. Wichita, Kansas. Apr. 12-15, 1983. pp. 1-12.
Dickey, T.A. and Dobak, E.R. (1972). The evolution and development status of ALF 502 turbofan engine. National Aerospace Engineering and Manufacturing Meeting. San Diego, California. Oct. 2-5, 1972. pp. 1-12.
Gunston, B. (Ed.) (2000). Jane's aero-engines, Issue seven. Coulsdon, Surrey, UK: Jane's Information Group Limited. pp. 510-512.
Ivchenko-Progress D-436. Jane's Aero-engines, Aero-engines—Turbofan. Feb. 8, 2012.
Ivchenko-Progress AI-727M. Jane's Aero-engines, Aero-engines—Turbofan. Nov. 27, 2011.
Ivchenko-Progress D-727. Jane's Aero-engines, Aero-engines—Turbofan. Feb. 7, 2007.
Turbomeca Aubisque. Jane's Aero-engines, Aero-engines—Turbofan. Nov. 2, 2009.
Aviadvigatel D-110. Jane's Aero-engines, Aero-engines—Turbofan. Jun. 1, 2010.
Rolls-Royce M45H. Jane's Aero-engines, Aero-engines—Turbofan. Feb. 24, 2010.
Honeywell LF502. Jane's Aero-engines, Aero-engines—Turbofan. Feb. 9, 2012.
Munt, R. (1981). Aircraft technology assessment: Progress in low emissions engine. Technical Report. May 1981. pp. 1-171.
Waters, M.H. and Schairer, E.T. (1977). Analysis of turbofan propulsion system weight and dimension. NASA Technical Memorandum. Jan. 1977. pp. 1-65.

(56) References Cited

OTHER PUBLICATIONS

Avco Lycoming Divison. ALF 502L Maintenance Manual. Apr. 1981. pp. 1-118.
Type Certificate Data Sheet No. E6NE. Department of Transportation Federal Aviation Administration. Jun. 7, 2002. pp. 1-10.
Trembley, Jr., H.F. (1977). Determination of effects of ambient conditions on aircraft engine emissions. Prepared for Environmental Protection Agency. Ann Arbor, Michigan. Sep. 1977 pp. 1-256.
Honeywell LF502. Jane's Aero-engines, Aero-engines—Turbofan. Aug. 17, 2016.
Rauch, D. (1972). Design study of an air pump and integral lift engine ALF-504 using the Lycoming 502 core. Prepare for NASA. Jul. 1972. pp. 1-182.
Dassault Falcon 900EX Easy Systems Summary. Retrieved from: http://www.smartcockpit.com/docs/F900EX-Engines.pdf pp. 1-31.
Honeywell TFE731 Pilot Tips. pp. 1-143.
Honeywell TFE731-5AR to -5BR Engine Conversion Program. Sep. 2005. pp. 1-4.
Garret TFE731 Turbofan Engine (CAT C). Chapter 79: Lubrciation System. TTFE731 Issue 2. 2010. pp. 1-24.
Mcardle, J.G. (1979). Static test-stand performance of the YF-102 turbofan engine with several exhaust configurations for the quiet short-haul research aircraft (QSRA). Nasa Technical Paper. Nov. 1979. pp. 1-68.
Davies, D. and Miller, D.C. (1971). A variable pitch fan for an ultra quiet demonstrator engine. 1976 Spring Convention: Seeds for Success in Civil Aircraft Design in the Next Two Decades. pp. 1-18.
Middleton, P. (1971). 614: VFW's jet feederliner. Flight International, Nov. 4, 1971. p. 725, 729-732.
Schaefer, J.W., Sagerser, D.R., and Stakolich, E.G. (1977). Dynamics of high-bypass-engine thrust reversal using a variable-pitch fan. Technical Report prepare for NASA. NASA-TM-X-3524. May 1, 1977. pp. 1-33.
Savelle, S.A. and Garrard, G.D. (1996). Application of transient and dynamic simulations to the U.S. Army T55-L-712 helicopter engine. The American Society of Mechanical Engineers. Presented Jun. 10-13, 1996. pp. 1-8.
Drago, R.J. and Margasahayam, R.N. (1987). Stress analysis of planet gears with integral bearings; 3D finite-element model development and test validation. 1987 MSC NASTRAN World Users Conference. Los Angeles, CA. Mar. 1987. pp. 1-14.
Baker, R.W. (2000). Membrane technology and applications. New York, NY: McGraw-Hill. pp. 87-153.
Cheryan, M. (1998). Ultrafiltration and microfiltration handbook. Lancaster, PA: Tecnomic Publishing Company, Inc. pp. 171-236.
Seader, J.D. and Henley, E.J. (1998). Separation process principles. New York, NY: John Wiley & Sons, Inc. pp. 722-726 and 764-771.
Spadaccini, L.J., and Huang, H. (2002). On-line fuel deoxygenation for coke suppression. ASME, Jun. 2002. pp. 1-7.
Darrah, S. (1987). Jet fuel deoxygenation. Interim Report for Period Mar. 1987-Jul. 1988. pp. 1-22.
Bucknell, R.L. (1973). Influence of fuels and lubricants on turbine engine design and performance, fuel and lubricant analyses. Final Technical Report, Mar. 1971-Mar. 1973. pp. 1-252.
Hazlett, R.N. (1991). Thermal oxidation stability of aviation turbine fuels. Philadelphia, PA: ASTM. pp. 1-163.
Taylor, W.F. (1974). Deposit formation from deoxygenated hydrocarbons. I. General features. Ind. Eng. Chem., Prod. Res. Develop., vol. 13(2). 1974. pp. 133-138.
Taylor, W.F. (1974). Deposit formation from deoxygenated hydrocarbons. II. Effect of trace sulfur compounds. Ind. Eng. Chem., Prod. Res. Dev., vol. 15(1). 1974. pp. 64-68.
Taylor, W.F. and Frankenfeld, J.W. (1978). Deposit fromation from deoxygenated hydrocarbons. 3. Effects of trace nitrogen and oxygen compounds. Ind. Eng. Chem., Prod. Res. Dev., vol. 17(1). 1978. pp. 86-90.
Frankenfeld, J.W. and Taylor, W.F. (1980). Deposit fromation from deoxygenated hydrocarbons. 4. Studies in pure compound systems. Ind. Eng. Chem., Prod. Res. Dev., vol. 19(1). 1978. pp. 65-70.

Hemighaus, G., Boval, T., Bacha, J., Barnes, F., Franklin, M., Gibbs, L., . . . Morris, J. (2007). Aviation fuels: Techincal review. Chevron Products Company. pp. 1-94. Retrieved from: https://www.cgabusinessdesk.com/document/aviation_tech_review.pdf.
Spadaccini, L.J., Sobel, D.R., and Huang, H. (2001). Deposit formation and mitigation in aircraft fuels. Journal of Eng. for Gas Turbine and Power, vol. 123. Oct. 2001. pp. 741-746.
Edwards, T. and Zabarnick, S. (1993). Supercritical fuel deposition mechanisms. Ind. Eng. Chem. Res. vol. 32. 1993. pp. 3117-3122.
Huang, H., Sobel, D.R., and Spadaccini, L.J. (2002). Endothermic heat-sink of hydrocarbon fuels for scramjet cooling. AIAA/ASME/SAE/ASEE, Jul. 2002. pp. 1-7.
Bessarabov, D.G., Jacobs, E.P., Sanderson, R.D., and Beckman, I.N. (1996). Use of nonporous polymeric flat-sheet gas-separation membranes in a membrane-liquid contactor: experimental studies. Journal of Membrane Sciences, vol. 113. 1996. pp. 275-284.
Matsumoto, T., Toshiro, U., Kishida, A., Tsutomu, F., Maruyama, I., and Akashi, M. (1996). Novel functional polymers: Poly (dimethylsiloxane)-polyamide multiblock copolymer. VII. Oxygen permeability of aramid-silicone membranes in a gas-membrane-liquid system. Journal of Applied Polymer Science, vol. 64(6). May 9, 1997. pp. 1153-1159.
Technical Data. Teflon. WS Hampshire Inc. Retrieved from: http://catalog.wshampshire.com/Asset/psg_teflon_ptfe.pdf.
Anderson, N.E., Loewenthal, S.H., and Black, J.D. (1984). An analytical method to predict efficiency of aircraft gearboxes. NASA Technical Memorandum prepared for the Twentieth Joint Propulsion Conference. Cincinnati, OH. Jun. 11-13, 1984. pp. 1-25.
Edkins, D.P., Hirschkron, R., and Lee, R. (1972). TF34 turbofan quiet engine study. Final Report prepared for NASA. NASA-CR-120914. Jan. 1, 1972. pp. 1-99.
Meyer, A.G. (1988). Transmission development of TEXTRON Lycoming's geared fan engine. Technical Paper. Oct. 1988. pp. 1-12.
Dudley, D.W., Ed. (1962). Gear handbook. New York, NY: McGraw-Hill. pp. 14-17 (TOC, Preface, and Index).
Hughes, C. (2002). Aerodynamic performance of scale-model turbofan outlet guide vanes designed for low noise. Prepared for the 40th Aerospace Sciences Meeting and Exhibit. Reno, NV. NASA/TM-2001-211352. Jan. 14-17, 2002. pp. 1-38.
Kaplan, B., Nicke, E., Voss, C. (2006), Design of a highly efficient low-noise fan for ultra-high bypass engines. Proceedings of GT2006 for ASME Turbo Expo 2006: Power for Land, Sea and Air. Barcelona, SP. May 8-11, 2006. pp. 1-10.
Gates, D. Bombardier flies at higher market. Seattle Times. Jul. 13, 2008. pp. C6.
Decker, S. and Clough, R. (2016). GE wins shot at voiding pratt patent in jet-engine clash. Bloomberg Technology. Retrieved from: https://www.bloomberg.com/news/articles/2016-06-30/ge-wins-shot-to-invalidate-pratt-airplane-engine-patent-in-u-s.
Trembley, Jr., H.F. (1977). Determination of effects of ambient conditions on aircraft engine emissions. ALF 502 combustor rig testing and engine verification test. Prepared for Environmental Protection Agency. Sep. 1977. pp. 1-256.
Lewicki, D.G., Black, J.D., Savage, M., and Coy, J.J. (1985). Fatigue life analysis of a turboprop reduction gearbox. NASA Technical Memorandum. Prepared for the Design Technical Conference (ASME). Sep. 11-13, 1985. pp. 1-26.
McCune, M.E. (1993). Initial test results of 40,000 horsepower fan drive gear system for advanced ducted propulsion systems. AIAA 29th Joint Conference and Exhibit. Jun. 28-30, 1993. pp. 1-10.
Wright, G.H. and Russell, J.G. (1990). The M.45SD-02 variable pitch geared fan engine demonstrator test and evaluation experience. Aeronautical Journal., vol. 84(836). Sep. 1980. pp. 268-277.
Drago, R.J. (1974). Heavy-lift helicopter brings up drive ideas. Power Transmission Design. Mar. 1987. pp. 1-15.
Krantz, T.L. (1990). Experimental and analytical evaluation of efficiency of helicopter planetary stage. NASA Technical Paper. Nov. 1990. pp. 1-19.
Heingartner, P., MBA, D., Brown, D. (2003). Determining power losses in the helical gear mesh; Case Study. ASME 2003 Design Engineering Technical Conferences. Chicago, IL. Sep. 2-6, 2003. pp. 1-7.

(56) References Cited

OTHER PUBLICATIONS

Thulin, R.D., Howe, D.C., and Singer, I.D. (1982). Energy efficient engine: High pressure turbine detailed design report. Prepared for NASA. NASA CR-165608. pp. 1-178.

Reshotko, M., Karchmer, A., Penko, P.F. (1977). Core noise measurements on a YF-102 turbofan engine. NASA TM X-73587. Prepared for Aerospace Sciences Meeting sponsored by the American Institute of Aeronautics and Astronautics. Jan. 24-26, 2977.

Extended European Search Report or Application No. EP 07252647.8 dated Jan. 25, 2011.

The Supplementary European Search Report for EP Application No. 13865131.0, dated Apr. 26, 2016.

International Preliminary Report on Patentability for PCT Application No. PCT/US2013/062220, dated Apr. 9, 2015.

The International Search Report and Written Opinion for International Application No. PCT/US2013/062220, dated Aug. 15, 2014.

\* cited by examiner

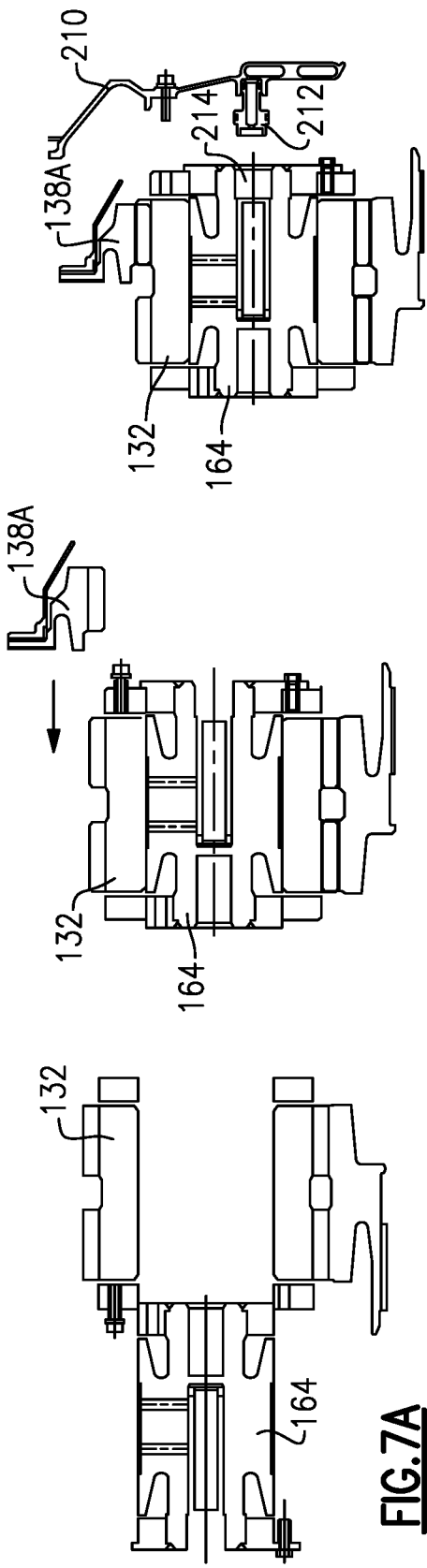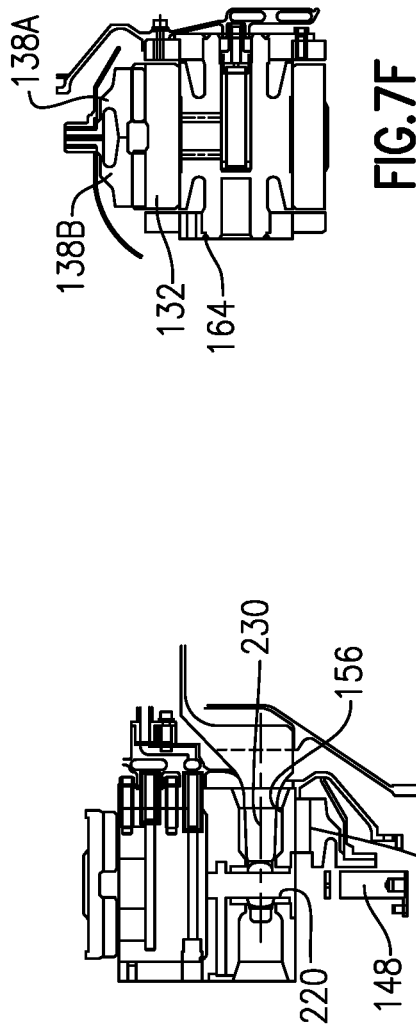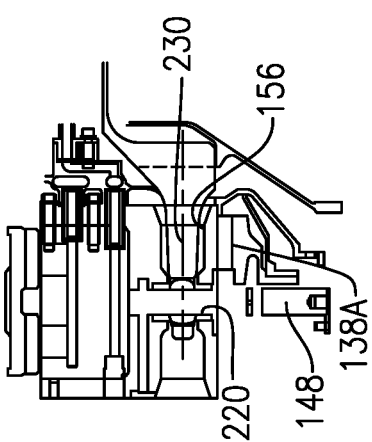

METHOD OF ASSEMBLY FOR GAS TURBINE FAN DRIVE GEAR SYSTEM

This application is a continuation of U.S. patent application Ser. No. 14/222,919, filed Mar. 24, 2014, which is a divisional of U.S. patent application Ser. No. 13/975,635, filed Aug. 26, 2013, which is a divisional of U.S. patent application Ser. No. 13/629,834, filed Sep. 28, 2012, now U.S. Pat. No. 8,667,688, which is a continuation-in-part of U.S. patent application Ser. No. 12/718,436, filed Mar. 5, 2010, now U.S. Pat. No. 8,276,275, which is a divisional application of U.S. patent application Ser. No. 11/481,112, filed on Jul. 5, 2006, now U.S. Pat. No. 7,704,178.

BACKGROUND OF THE INVENTION

This invention relates to assembling an epicyclic gear train employed to drive a turbo fan.

Gas turbine engines may employ an epicyclic gear train connected to a turbine section of the engine, which is used to drive the turbo fan. In a typical epicyclic gear train, a sun gear receives rotational input from a turbine shaft through a compressor shaft. A carrier supports intermediate gears that surround and mesh with the sun gear. A ring gear surrounds and meshes with the intermediate gears. In arrangements in which the carrier is fixed against rotation, the intermediate gears are referred to as "star" gears and the ring gear is coupled to an output shaft that supports the turbo fan. In arrangements in which the ring gear is fixed against rotation, the intermediate gears are referred to as "planetary" gears and the carrier is coupled to the output shaft that supports the turbo fan.

The housings are typically split along a central plane, and the gear train can be assembled, with the carrier housing halves then being brought together and secured. For improved strength and rigidity, as compared with a two-part housing, it is desirable for an epicyclic gear train to have a unitary carrier housing.

SUMMARY OF THE INVENTION

In a featured embodiment, a method of assembling an epicyclic gear train comprises the steps of providing a unitary carrier having a central axis that includes spaced apart walls and circumferentially spaced connecting structure defining spaced apart apertures provided at an outer circumference of the carrier. Gear pockets are provided between the walls and extend to the apertures. A central opening is in at least one of the walls. A plurality of intermediate gears are inserted through the central opening and move the intermediate gears radially outwardly into the gear pockets to extend into the apertures. A sun gear is inserted through the central opening. The plurality of intermediate gears is moved radially inwardly to engage the sun gear.

In another embodiment according to the previous embodiment, moving the plurality of intermediate gears radially inwardly to engage the sun gear occurs after the sun gear is inserted through the central opening.

In another embodiment according to any of the previous embodiments, journal bearings are inserted within each of the intermediate gears after the sun gear is inserted through the central opening.

In another embodiment according to any of the previous embodiments, a ring gear is subsequently placed on an outer periphery of the sun gears to engage the sun gears.

In another embodiment according to any of the previous embodiments, the sun gear and the intermediate gears are each formed as a single gear, and the ring gear is formed as a two-part gear.

In another embodiment according to any of the previous embodiments, a first ring gear half is first placed about the outer periphery of the intermediate gears, and a torque frame is then attached to the carrier.

In another embodiment according to any of the previous embodiments, a second ring gear half is mounted to the outer periphery subsequent to the torque frame being mounted to the carrier.

In another embodiment according to any of the previous embodiments, the torque frame has a plurality of axially extending fingers that are received within slots in the carrier, at locations circumferentially intermediate locations of the intermediate gears. The first ring gear half is moved such that it does not block radially inwardly extending apertures in a radially outer surface of the carrier. Pins are then moved into the apertures to lock the fingers within the slots, with the first ring gear half then being moved over the apertures.

In another embodiment according to any of the previous embodiments, the second ring gear half is placed on the intermediate gears subsequent to the locking of the fingers within the slots.

In another featured embodiment, a method of mounting a gear train to a torque frame comprises providing a unitary carrier having a central axis that includes spaced apart walls and circumferentially spaced connecting structure defining mounts for interconnecting the walls. Spaced apart apertures are provided between the mounts at an outer circumference of the carrier. Gear pockets are provided between the walls. Mounts extend to the apertures, and a central opening in at least one of the walls. A plurality of intermediate gears and a sun gear are inserted in the carrier. A first ring gear half is placed about the outer periphery of the intermediate gears, and attach a torque frame to the carrier.

In another embodiment according to the previous embodiment, a second ring gear half is then mounted to the outer periphery subsequent to the torque frame being mounted to the carrier.

In another embodiment according to any of the previous embodiments, the torque frame has a plurality of axially extending fingers that are received within slots in the carrier, at locations circumferentially intermediate locations of the intermediate gears. The first ring gear half is moved such that it does not block radially inwardly extending apertures in a radially outer surface of the carrier. Pins are then moved into the apertures to lock the fingers within the slots. The first ring gear half then is moved over the apertures.

In another embodiment according to any of the previous embodiments, the second ring gear half is placed on the intermediate gears subsequent to the locking of the fingers within the slots.

In another embodiment according to any of the previous embodiments, the sun gear and intermediate gears are each formed as a single gear, and the ring gear is formed.

In another embodiment according to any of the previous embodiments, the sun gear and the intermediate gears have two spaced portions. Each of the portions has helical gear teeth, with the helical gear teeth on the two portions extending in opposed directions. The two ring gear halves each have one direction of helical gear teeth, with the helical gear teeth on the two ring gear halves extending in opposed directions.

In another embodiment according to any of the previous embodiments, journal bearings are inserted within each of the intermediate gears prior to a first ring gear half being placed about the outer periphery of the intermediate gears, and attaching a torque frame to the carrier.

In another featured embodiment, a gear reduction for use in a gas turbine engine comprises a unitary carrier centered on an axis and having a pair of axially spaced apart side walls, and axially extending circumferentially spaced connecting structure for connecting the pair of spaced side walls. A central opening, and circumferentially spaced smaller openings are spaced radially outwardly of the central opening. Internal surfaces of the circumferentially spaced curved walls define intermediate gear pockets, with the intermediate gear pockets extending away from the central enlarged opening for a distance greater than a diameter of intermediate gears received in the intermediate gear pockets. Intermediate gears are received in the intermediate gear pockets, and secured at a position spaced radially inwardly of a radially outermost area in the intermediate gear pockets. The intermediate gears have teeth engaged with teeth of a sun gear received in the central opening. A ring gear is received at radially outer locations such that ring gear teeth engage teeth of the intermediate gears.

In another embodiment according to the previous embodiment, the intermediate gears and the sun gear are formed of single gear bodies. The ring gear is formed of two separate ring gear halves. The intermediate gears are secured by bushings. Journal bearings are inserted within each of the intermediate gears.

In another embodiment according to any of the previous embodiments, a torque frame has a plurality of axially extending fingers received within slots in the carrier, at locations circumferentially intermediate of locations of the intermediate gears. Pins inwardly of radially inwardly extend apertures in a radially outer surface of the carrier. The pins lock the fingers within the slot. The ring gear is received radially outwardly of the radially inwardly extending apertures.

In another embodiment according to any of the previous embodiments, the sun gear and the intermediate gears have two spaced portions. Each of the portions have helical gear teeth, with the helical gear teeth on the two portions extending in opposed directions. The two ring gear halves each has one direction of helical gear teeth, with the helical gear teeth on the two halves ring gear extending in opposed directions.

These and other features of the present invention can be best understood from the following specification and drawings, the following of which is a brief description.

BRIEF DESCRIPTION OF THE DRAWINGS

FIG. 7A shows an assembly step.

FIG. 7B shows a subsequent assembly step.

FIG. 7C shown another subsequent step.

FIG. 7E shows a subsequent step.

FIG. 7F shows you another subsequent step.

DETAILED DESCRIPTION

Figure 1:
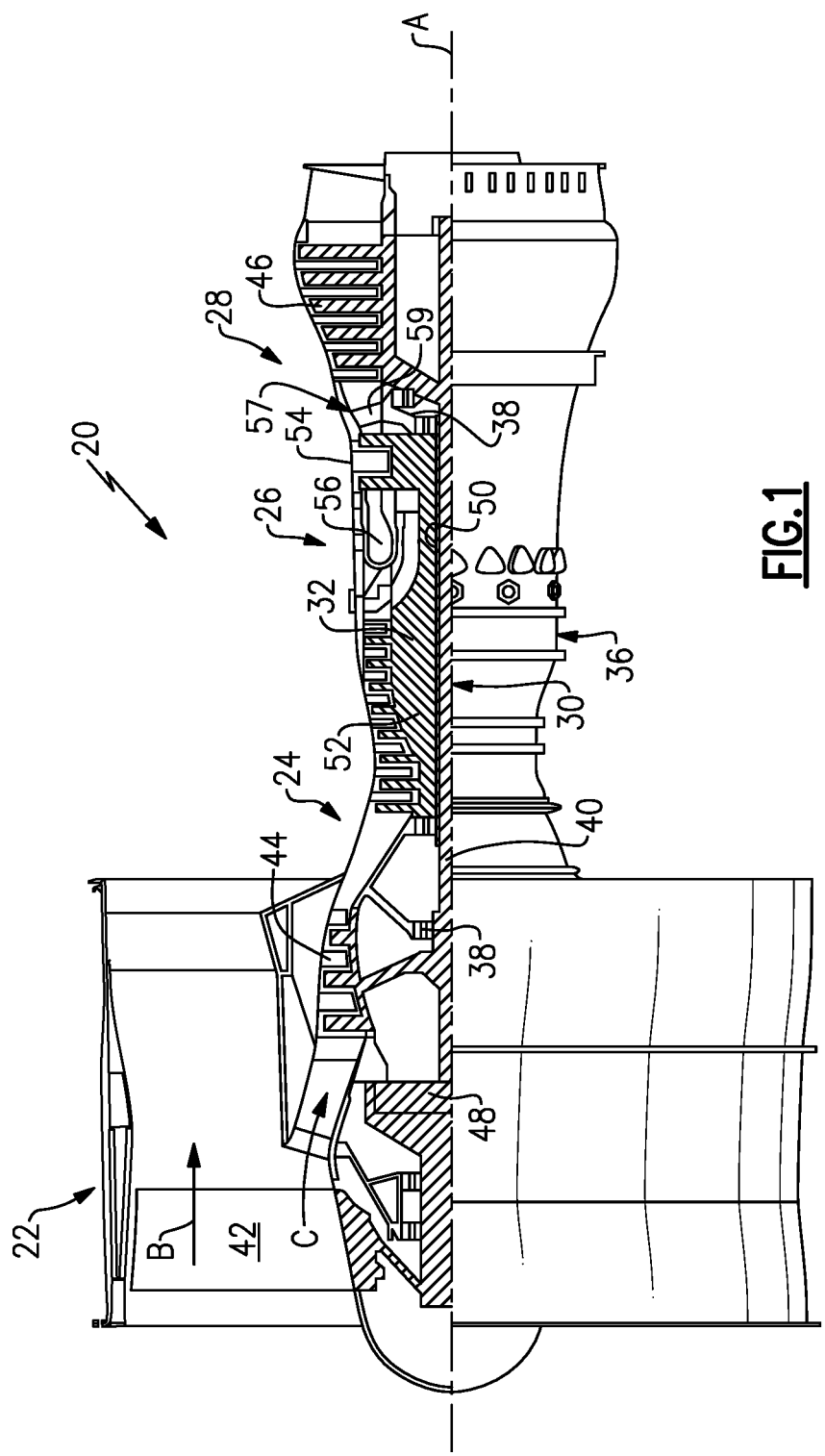
FIG. 1 is a partial cross-sectional view of a front portion of a gas turbine engine illustrating a turbo fan, epicyclic gear train and a compressor section.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flowpath B while the compressor section 24 drives air along a core flowpath C for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines including three-spool architectures.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that interconnects a fan 42, a low pressure compressor 44 and a low pressure turbine 46. The inner shaft 40 is connected to the fan 42 through a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path. The turbines 46, 54 rotationally drive the respective low speed spool 30 and high speed spool 32 in response to the expansion.

The engine 20 in one example is a high-bypass geared aircraft engine. In a further example, the engine 20 bypass ratio is greater than about six (6), with an example embodiment being greater than ten (10), the geared architecture 48 is an epicyclic gear train, such as a planetary gear system or other gear system, with a gear reduction ratio of greater than about 2.3 and the low pressure turbine 46 has a pressure ratio that is greater than about 5. In one disclosed embodiment, the engine 20 bypass ratio is greater than about ten (10:1), the fan diameter is significantly larger than that of the low pressure compressor 44, and the low pressure turbine 46 has a pressure ratio that is greater than about 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.5:1. It should be understood, however, that the above parameters are only exemplary of one embodiment of a geared architecture engine.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFCT')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram} \degree \text{R})/(518.7\degree \text{R})]^{0.5}$. The "Low corrected fan tip speed" as disclosed herein according to one non-limiting embodiment is less than about 1150 ft/second.

Figure 2:
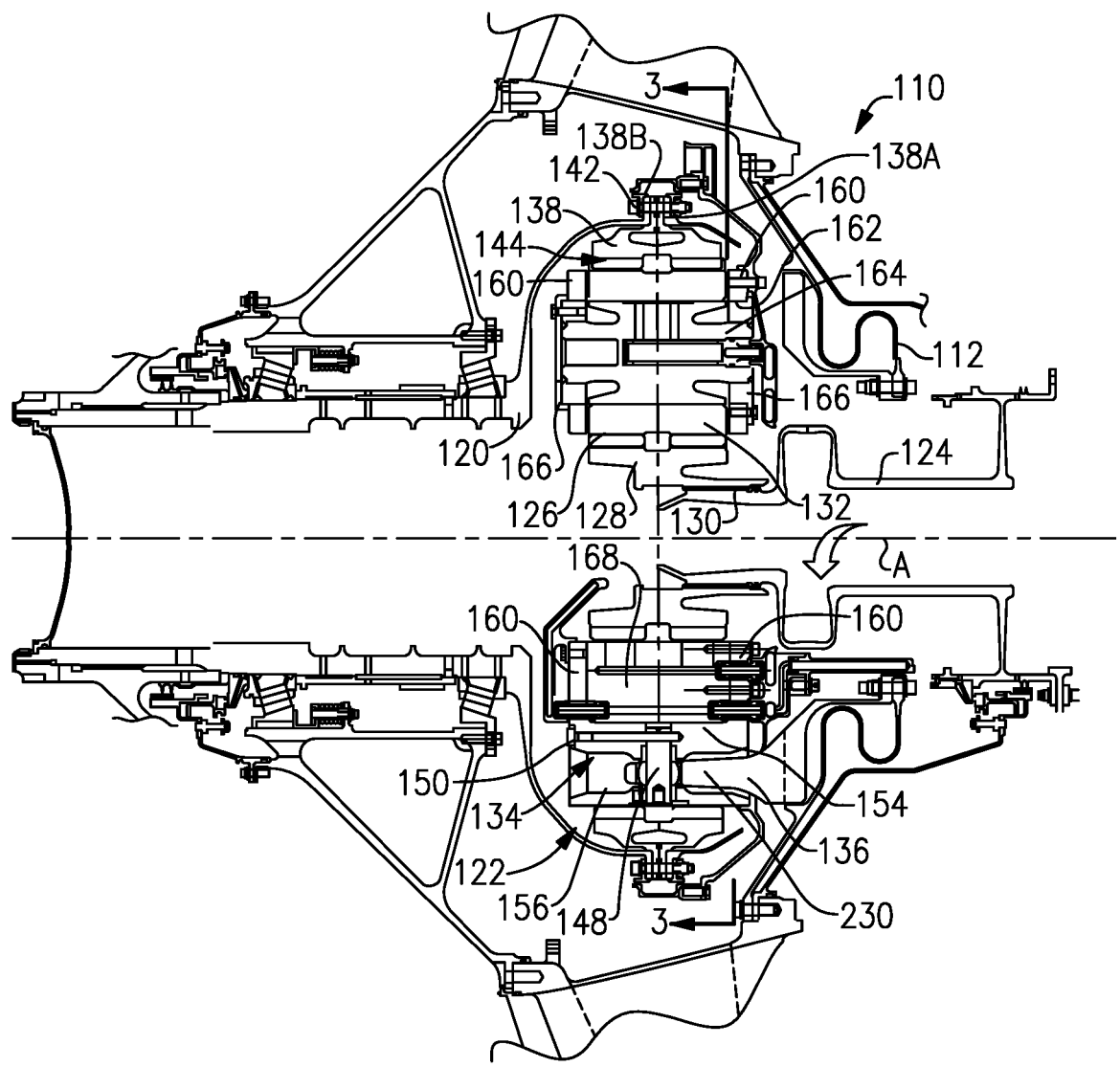
FIG. 2 is a cross-sectional view of the epicyclic gear train shown in FIG. 1.

The geared architecture 48 may be assembled as described below for gear train 122. In the example arrangement shown, the epicyclic gear train 122 is a star gear train. Of course, the claimed invention also applies to other epicyclic gear trains such as a planetary arrangement. Referring to FIG. 2, the epicyclic gear train 122 includes a sun gear 128 that is connected to the compressor shaft 124, which provides rotational input, by a splined connection 130. A carrier 134 is fixed to the housing 112 by a torque frame 136. The carrier 134 supports intermediate gears (which are star gears 132 in the arrangement shown) that are coupled to the sun gear 128 by meshed interfaces 126 between the teeth of the sun and star gears 128, 132. A ring gear 138A/B surrounds the carrier 134 and is coupled to the star gears 132 by meshed interfaces 144. The ring gear 138A/B, which provides rotational output, is secured to the turbo fan shaft 120 by connection 142. Ring gear 138 is actually formed by two ring gear halves 138A and 138B.

Figure 5:
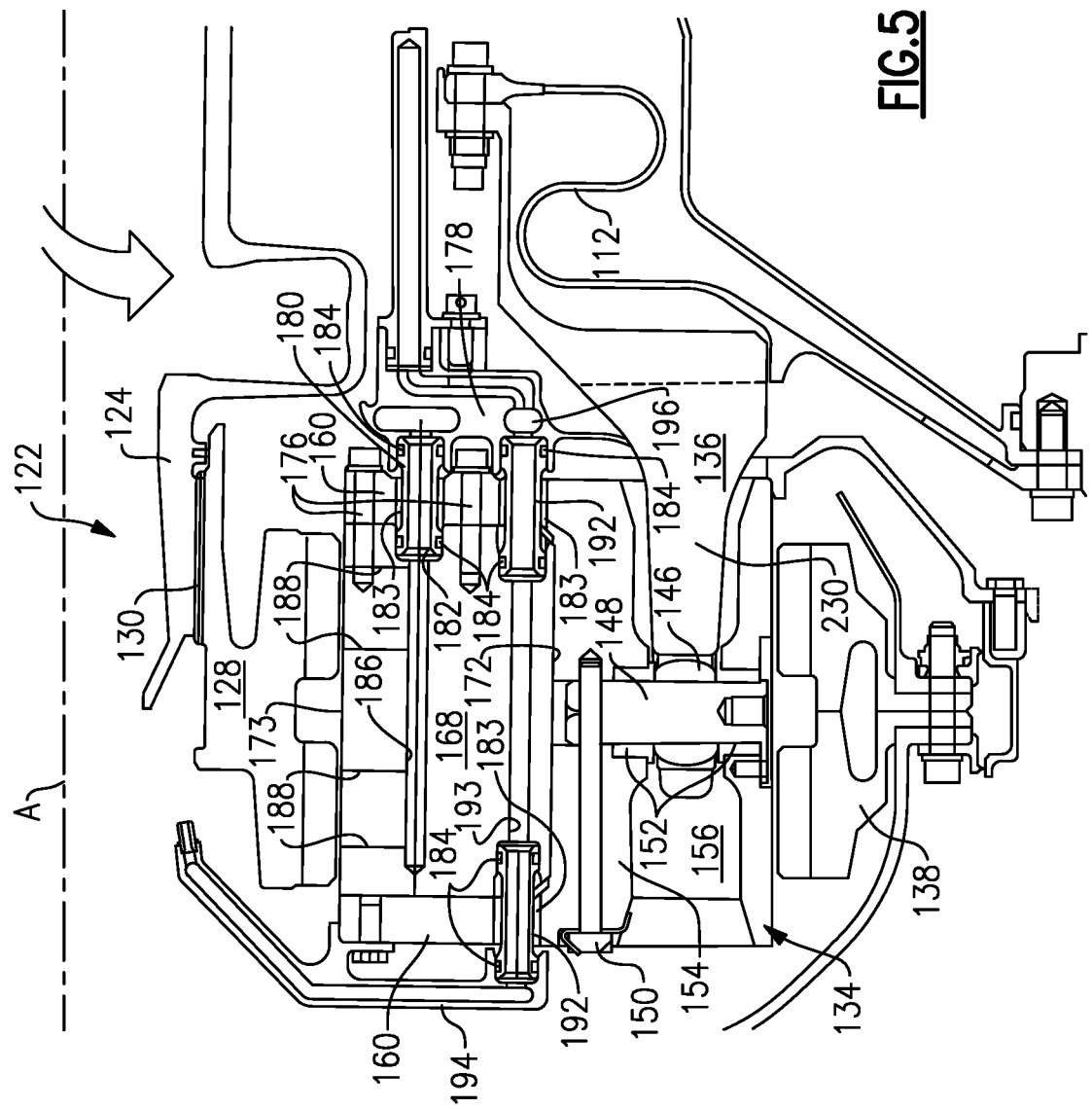
FIG. 5 is an enlarged view of a portion of the epicyclic gear train shown in FIG. 2.

In one example, the torque frame 136 grounds the carrier 134 to the housing 112. For example, mounts 154 have apertures 156 receiving fingers 230 of the torque frame 136, as shown in FIGS. 2 and 5. Pins 148 extend through spherical bearings 146 and bushings 152 secure the fingers 230 to the carrier 134. Fasteners 150 retain the pins 148 to the carrier 134.

Figure 3A:
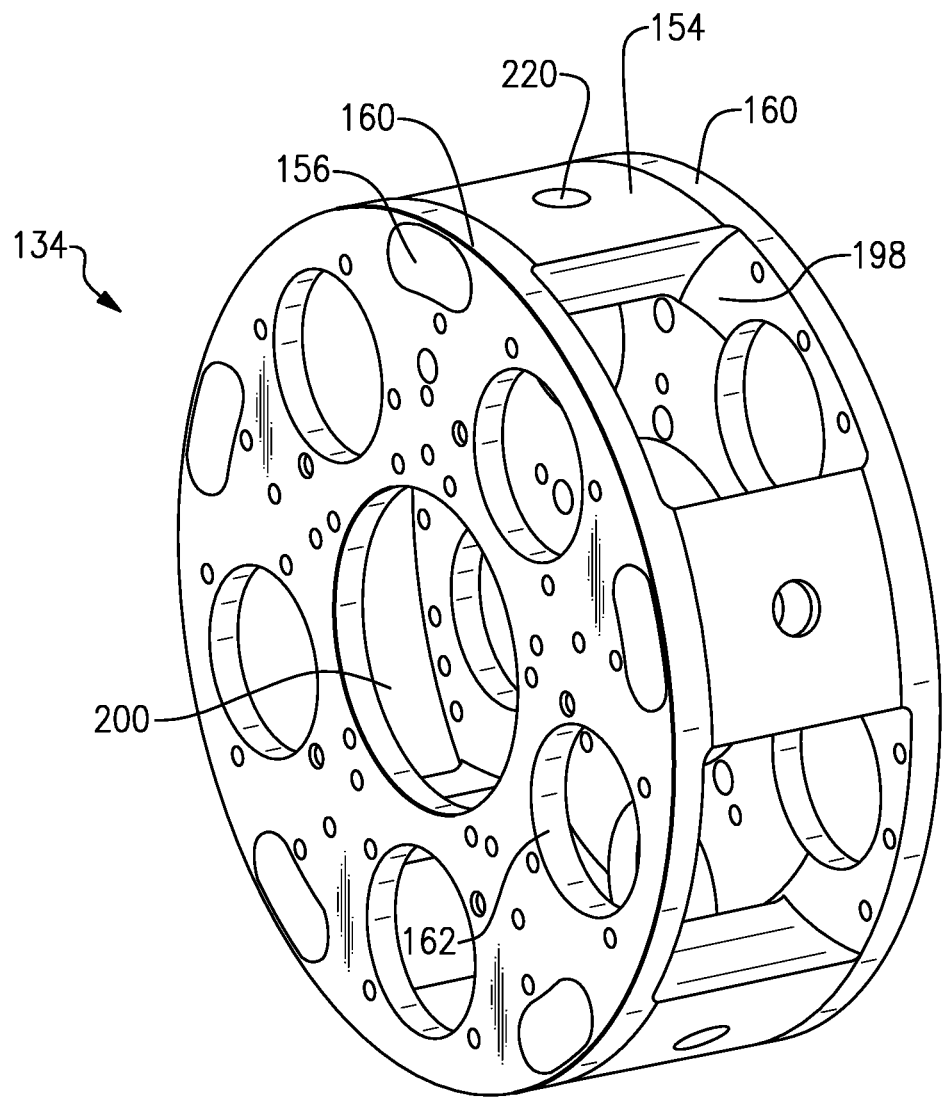
FIG. 3A shows a unitary carrier.
Figure 3B:
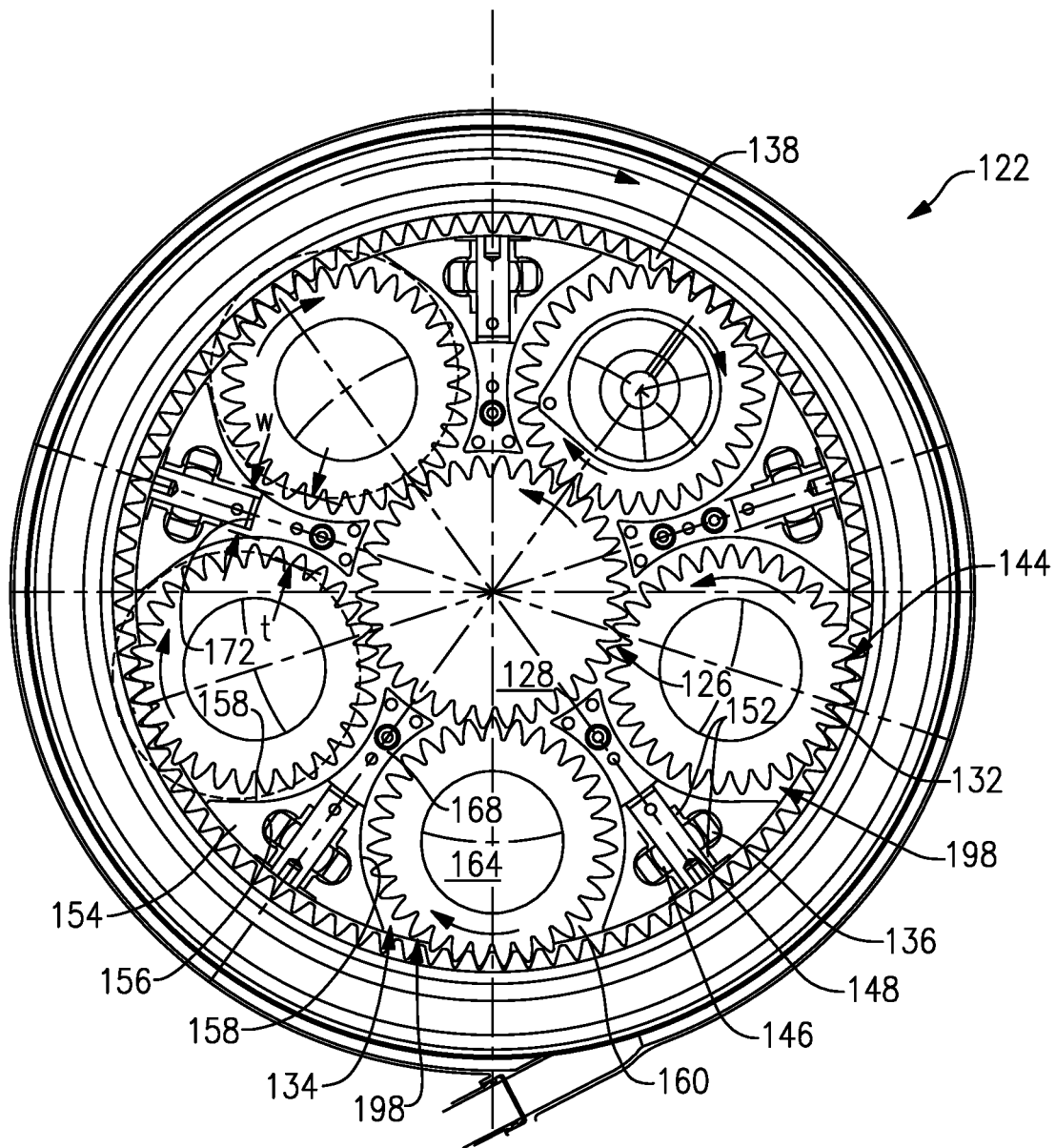
FIG. 3B is an end view of the epicyclic gear train taken along line 3-3 in FIG. 2 with star gears shown in an installation position.

The carrier 134 is a unitary structure manufactured from one piece for improved structural strength and rigidity, as compared with two-part housings, as shown in FIG. 3A. Carrier 134 is centered on an axis A (see FIG. 4). The carrier 134 includes axially spaced apart side walls 160 that are interconnected by the circumferentially spaced structure defining mounts 154, which are generally wedge-shaped members, as best shown in FIG. 3B. The mounts 154 and side walls 160 are unitary with one another. That is, these components are fixed, such as by being welded or cast as a unitary structure, before the gear train is assembled. The mounts 154 have opposing curved surfaces (see FIG. 3B) 158 that are in close proximity to the star gears 132 and generally follow the curvature of the teeth of the star gears 132 so that any oil on the curved surfaces 158 will likely find its way to the star gears 132 for additional lubrication.

The mounts 154 are circumferentially spaced about the carrier 134 to provide apertures 198 through which the star gears 132 extend to engage the ring gear 138. The side walls 160 include holes 162 for receiving a journal bearing 164 (see FIG. 2) that supports each of the star gears 132. Each journal bearing 164 is retained within the carrier 134 by retainers 166 fastened to the side walls 160.

Figure 4:
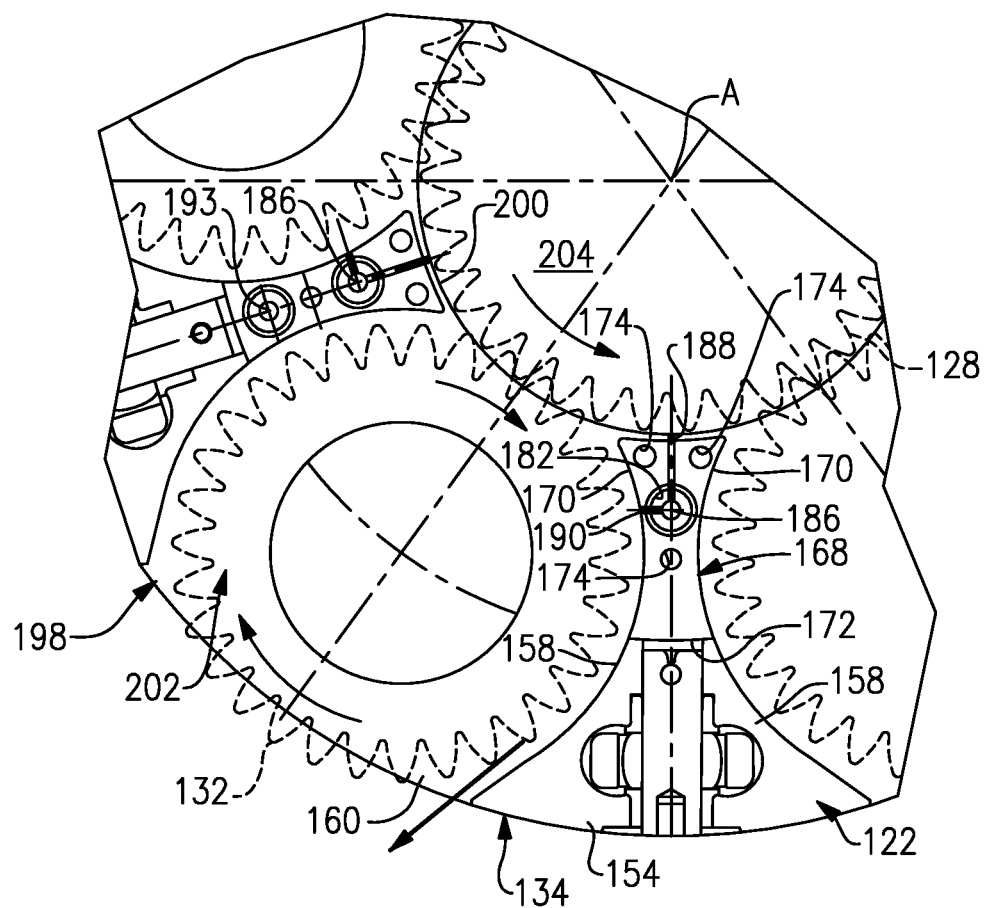
FIG. 4 is an enlarged view of a portion of the epicyclic gear train shown in FIG. 3 with a sun gear and star gears shown in phantom.

Oil baffles 168 are arranged between the side walls 160 near each of the mounts 154, best shown in FIG. 2. Referring to FIGS. 4 and 5, the baffles 168 include ends 172 that abut the mounts 154, in the example shown. The baffles 168 also include opposing curved surfaces 170 arranged in close proximity to the star gears 128. The curved surfaces 158, 170 are contiguous with and adjoin one another, in the example shown, and provide gear pockets 202 that receive the star gears 132. A gear pocket 204, which receives the sun gear 128, is also provided between a surface 173 on each of the baffles 168 opposite the ends 172.

As shown in FIG. 4, one of the side walls 160 includes holes 174 that receive fasteners 176 which secure each of the baffles 168 to the carrier 134. The baffles 168 include a lubrication passage provided by a primary passage 186 that fluidly communicates with a lubricant distributor 178. The lubricant distributor 178 is fed oil from a lubricant supply 196. In one example, the baffles 168 include openings 182 that receive a tube 180 extending through a hole 183 in the side wall 160. Seals 184 seal the tube 180 to the opening 182 and lubricant distributor 178. Other tubes 192 having seals 184 are used to provide oil to an external spray bar 194 through another lubrication passage (spray bar passage 193 that extends through one of the baffles 168). The external spray bar 194 is secured to the carrier 134 and sprays oil in the vicinity of the sun gear 128 near the splined connection 130 (shown in FIGS. 2 and 5).

The primary passage 186 is in communication with first and second passages 188, 190 that spray oil on the teeth of the sun and star gears 128, 132. In the example shown, the first and second passages 188, 190 are arranged ninety degrees from one another.

With the example baffles 168, lubricant distribution is integrated into the baffle so that separate components are eliminated. The baffles 168 can be constructed from a different, lighter weight material than the carrier 134.

The example carrier 134 is constructed from one piece, which improves the structural integrity of the carrier. A central opening 200 is machined in at least one of the side walls 160 and provides the gear pocket 204, see FIG. 4. Gear pockets 202 are machined between the side walls 160 and mounts 154 for each of the star gears 132 and form apertures 198 at an outer circumference of the carrier 134.

Figure 8:
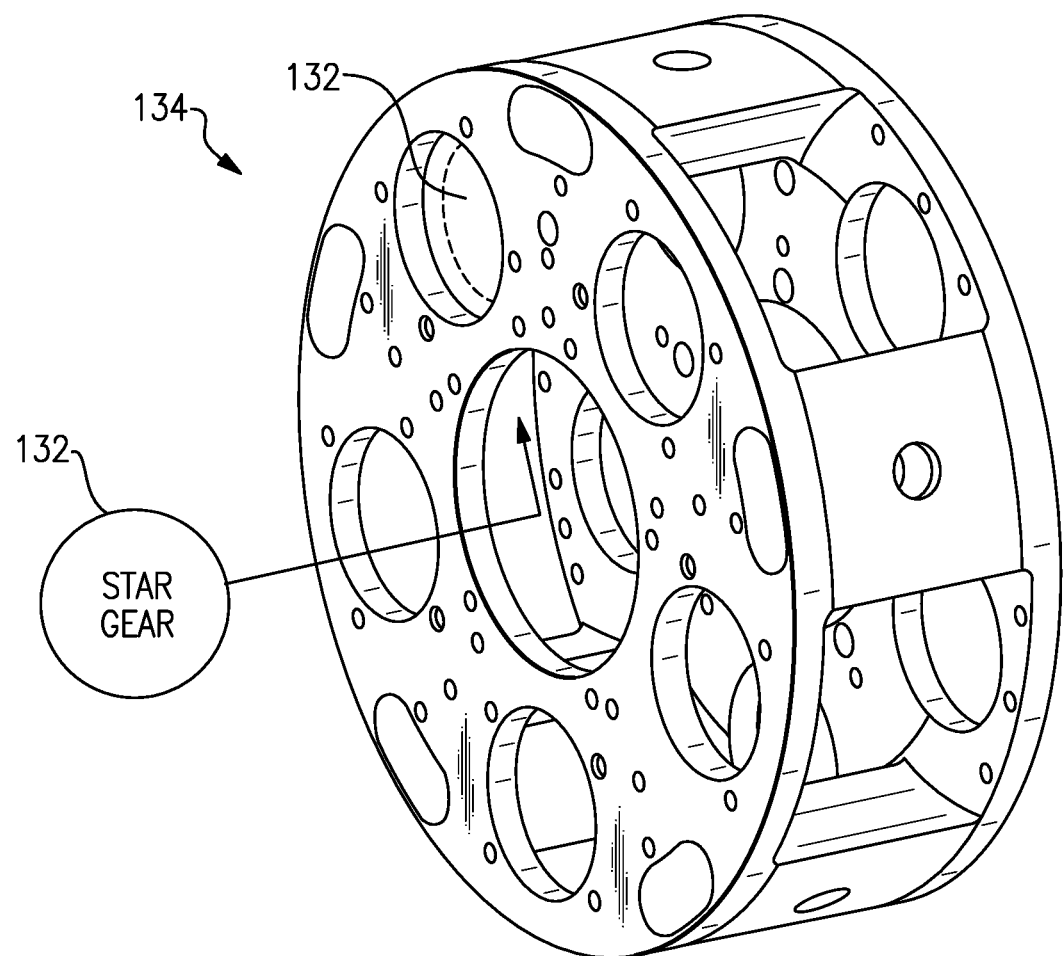
FIG. 8 schematically illustrates a star gear being inserted into the carrier.

Returning to FIG. 3B, the star gears 132 are inserted into the central opening 200 and moved radially outwardly so that they extend through the apertures 198 and are preferably in abutment with the mounts 154 (position indicated by dashed lines in FIG. 3B). This is schematically illustrated in FIG. 8. In this position, there is an adequate gap, t, between the teeth of adjacent star gears 132 to accommodate a width, w, of the end 172 of the baffles 168. After the baffles 168 have been inserted, sun gear 128 can be inserted into the central opening 200. The star gears 132 can now be moved radially inwardly to mesh with the sun gear 128. The baffles 168 are secured to the carrier 134 using fasteners 176. The tubes 180, 192 can be inserted and the rest of the lubricant distribution system can be connected.

Figure 9:
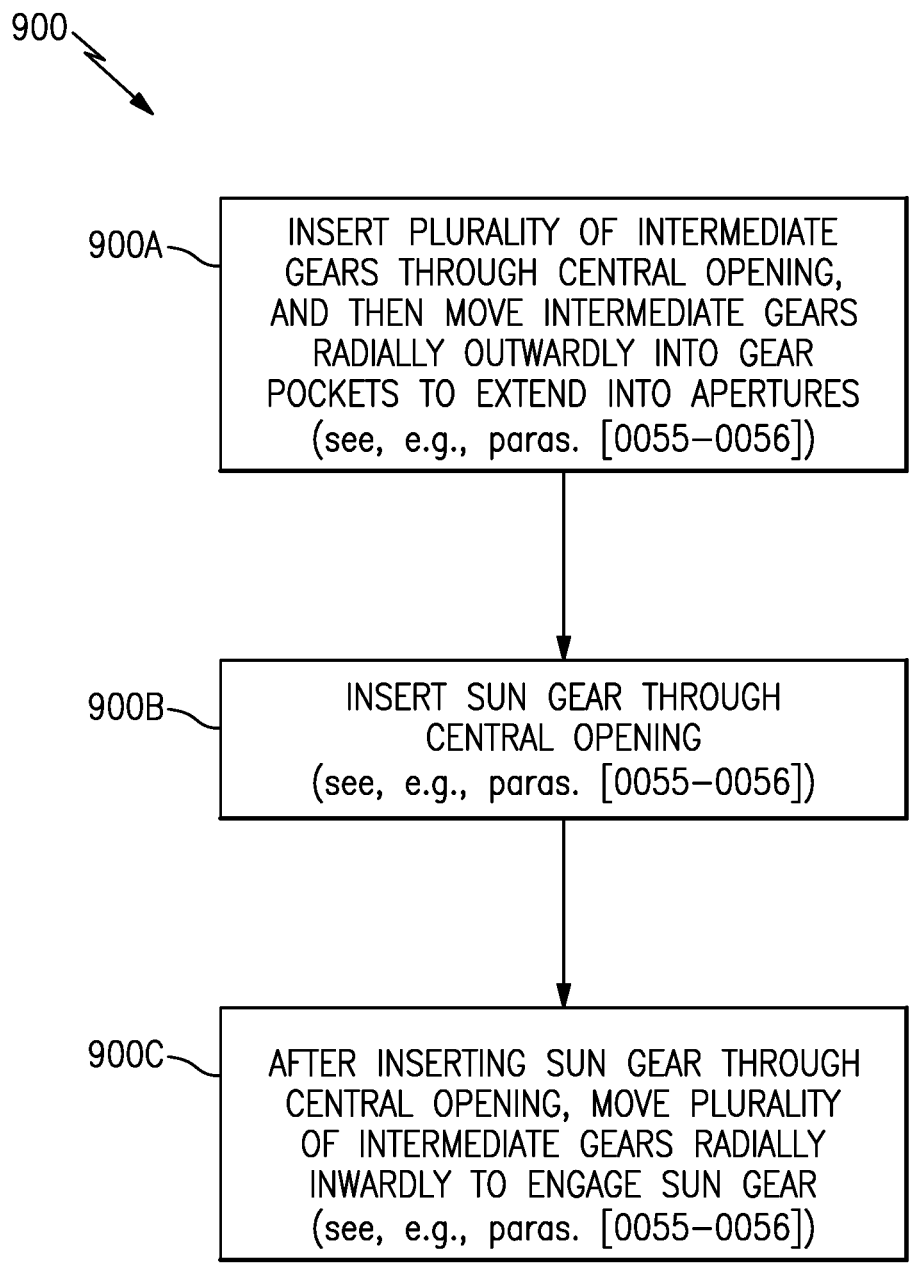
FIG. 9 illustrates an exemplary process for assembling a gear train.

As mentioned above, the star gears 132 are initially inserted within the central hole 200 for the sun gear (step 900A of process 900 in FIG. 9). The star gears 136 are moved radially outwardly (step 900A), and the spray bars or baffles 168 are inserted. The sun gear 128 is then inserted (step 900B in FIG. 9), and the star gears 132 may then be moved radially inwardly to engage the sun gear 128 (step 900C in FIG. 9). All of this assembly occurs with the carrier already formed as a unitary structure.

Figure 6:
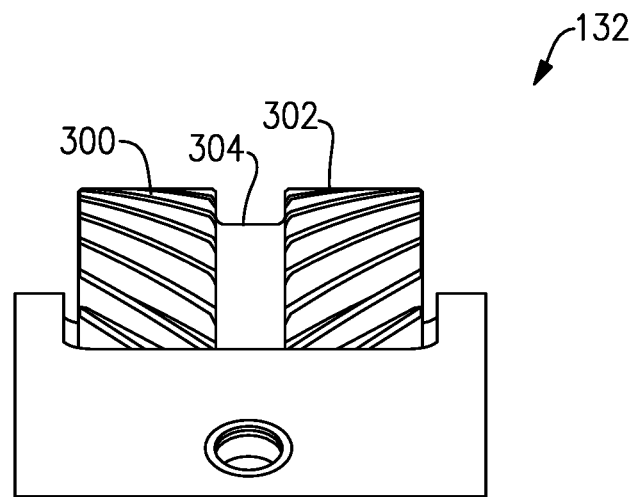
FIG. 6 shows a feature of a gear.

As shown in FIG. 6, the star gears 132 have two toothed portions, 302 and 300, which have helical gear teeth extending in opposed directions. A central area 304 is formed between the toothed portions 302 and 300. Notably, the sun gear looks much the same. The two-part ring gear 138A/B halves each mate with one of the two gear teeth directions.

As shown in FIG. 7A, once the sun gears 128 and star gears 132 are in engagement, the journal bearings 164 may be inserted within the star gears 132. After this, as shown in FIG. 7B, a first half of the ring gear 138A may be moved onto the outer periphery of the star gears 132. A manifold 210 may then be mounted to the gear as shown in FIG. 7C. The manifold 210 has a fluid connection 212 which would be received within a central aperture 214 in the journal bearings 164.

Figure 7D:
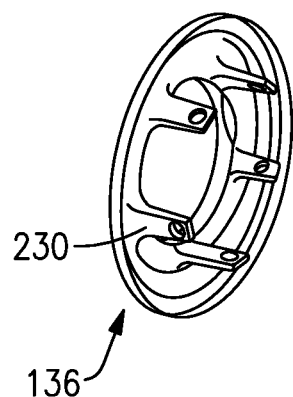
FIG. 7D shows a torque frame.

FIG. 7D shows a detail of a torque frame 136. As shown, fingers 230 extend away from a plane of the torque frame. As mentioned above, the fingers 230 are received within the slots 156 in the unitary carrier 134. The pins 148 may then be moved inwardly through the openings 220 in the mounts 154 to lock the torque frame 156 to the carriers 134.

As can be appreciated in FIG. 7E, the ring gear half 138A has been moved axially such that it does not line up with the apertures 220 in the carrier, which is to receive the pin 148. Once the pin 148 has been moved inwardly to lock the finger 230 within the slot 156, then the ring gear half 138A may be moved back axially over a portion of the aperture 220.

As shown in FIG. 7F, the next step is to mount the other ring gear half 138B, completing the gear drive. At each step, all of the components are secured in some manner. An oil gutter may then be installed.

The arrangement as set forth above thus provides a way to assemble an epicyclic gear train within a unitary carrier housing. Such a gear train, configured and assembled as disclosed herein, has an improved strength and rigidity as compared with such a train having a two-part carrier housing.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A method of assembling an epicyclic gear train comprising the steps of:
   providing a carrier having a central axis that includes spaced apart side walls and circumferentially spaced connecting structure defining mounts that interconnect the side walls, spaced apart apertures provided at an outer circumference of the carrier, gear pockets provided between the side walls and extending to the apertures, and a central opening in at least one of the walls;
   providing oil baffles between the side walls, the oil baffles including ends that abut the mounts;
   inserting a plurality of intermediate gears through the central opening, and then moving the intermediate gears radially outwardly into the gear pockets to extend into the apertures;
   inserting a sun gear through the central opening; and
   moving the plurality of intermediate gears radially inwardly to engage the sun gear.

2. The method as set forth in claim 1, wherein the step of inserting the sun gear occurs after the step of providing the oil baffles.

3. The method as set forth in claim 2, wherein the step of moving the plurality of intermediate gears radially inwardly occurs after the step of inserting the sun gear.

4. The method as set forth in claim 2, wherein the oil baffles include opposing curved surfaces arranged in close proximity to the intermediate gears in an installed position, and the carrier is a unitary structure with the side walls and the mounts unitary with one another.

5. The method as set forth in claim 4, wherein the step of moving the intermediate gears radially outwardly includes positioning the intermediate gears in the gear pockets such that each of the intermediate gears extends through a respective one of the apertures to establish a gap between teeth of adjacent intermediate gears that accommodates a width of a respective one of the ends of the baffles.

6. The method as set forth in claim 4, further comprising placing a ring gear on an outer periphery of the intermediate gears to engage the intermediate gears after the step of moving the plurality of intermediate gears radially inwardly.

7. The method as set forth in claim 6, wherein the intermediate gears and the sun gear are each formed as a single gear.

8. The method as set forth in claim 6, further comprising attaching a torque frame to the carrier.

9. The method as set forth in claim 8, wherein the curved surfaces of the oil baffles are contiguous and adjoin with curved surfaces of the mounts to provide the gear pockets.

10. The method as set forth in claim 4, wherein a sun gear pocket that receives the sun gear is provided between a surface on each of the oil baffles that is opposite a respective one of the ends of the oil baffles.

11. The method as set forth in claim 10, wherein the step of providing the oil baffles includes inserting the oil baffles between the side walls subsequent to the step of providing the carrier and the step of moving the intermediate gears radially outwardly into the gear pockets, and further comprising securing the oil baffles to the carrier.

12. The method as set forth in claim 11, wherein the step of securing the oil baffles to the carrier includes securing the oil baffles to holes in one of the side walls with fasteners.

13. The method as set forth in claim 10, wherein each of the baffles includes a lubrication passage provided by a primary passage that fluidly communicates with a lubricant distributor.

14. The method as set forth in claim 13, wherein the baffles are constructed from a different, lighter weight material than the carrier.

15. The method as set forth in claim 13, wherein the primary passage communicates with first and second passages of a respective one of the baffles to spray oil on teeth of the sun gear and the intermediate gears.

16. The method as set forth in claim 15, wherein the lubricant distributor is fed oil from a lubricant supply.

17. The method as set forth in claim 16, wherein the first and second passages are arranged ninety degrees from one another.

18. The method as set forth in claim 16, wherein the baffles include openings that receive a first set of conduits extending through holes in one of the side walls.

19. The method as set forth in claim 18, wherein the first set of conduits are inserted into the openings after the step of securing the oil baffles to the carrier.

20. The method as set forth in claim 19, further comprising inserting another conduit in one of the baffles, wherein the another conduit provides oil to an external spray bar through a spray bar passage that extends through the one of the baffles.

21. The method as set forth in claim 20, wherein the external spray bar is secured to the carrier.

22. The method as set forth in claim 21, wherein the step of inserting the another conduit occurs after the step of securing the baffles to the carrier.

23. The method as set forth in claim 22, wherein the external spray bar sprays oil in a vicinity of the sun gear.

24. The method as set forth in claim 23, further comprising placing a ring gear on an outer periphery of the intermediate gears to engage the intermediate gears after the step of moving the plurality of intermediate gears radially inwardly.

25. The method as set forth in claim 24, wherein the intermediate gears and the sun gear are each formed as a single gear, and the ring gear is formed as a two-part gear including a first ring gear half and a second ring gear half.

26. The method as set forth in claim 25, further comprising inserting journal bearings within each of the intermediate gears after the step of moving the plurality of intermediate gears radially inwardly to engage the sun gear.

27. The method as set forth in claim 25, further comprising attaching a torque frame to the carrier.

28. The method as set forth in claim 27, wherein the step of placing the ring gear includes placing the first ring gear half about the outer periphery of the intermediate gears prior to the step of attaching the torque frame, and includes mounting the second ring gear half about the outer periphery after the step of attaching the torque frame.

29. The method as set forth in claim 28, wherein the sun gear and the intermediate gears have two spaced portions, with each of the portions having helical gear teeth, with the helical gear teeth on the two portions extending in opposed directions, and the first and second ring gear halves each having one direction of helical gear teeth, with the helical gear teeth on the first and second ring gear halves extending in opposed directions.

30. The method as set forth in claim 29, wherein the torque frame has a plurality of axially extending fingers which are received within slots in the carrier, at locations circumferentially intermediate locations of the intermediate gears, and the first ring gear half is moved such that the first ring gear half does not block radially inwardly extending apertures in a radially outer surface of the carrier, and pins are then moved into the apertures to lock the fingers within the slots, with the first ring gear half then being moved over the apertures.

\* \* \* \* \*